United States Patent
Matsuda et al.

(10) Patent No.: US 8,177,244 B2
(45) Date of Patent: May 15, 2012

(54) SUPPORTING STRUCTURE FOR VEHICLE SUSPENSION COMPONENT

(75) Inventors: Katsuhiro Matsuda, Ayase (JP); Takemi Takahashi, Isehara (JP)

(73) Assignee: Nissan Motor Co., Ltd., Kanagawa (JP)

( * ) Notice: Subject to any disclaimer, the term of this patent is extended or adjusted under 35 U.S.C. 154(b) by 304 days.

(21) Appl. No.: 12/668,821

(22) PCT Filed: Jul. 29, 2008

(86) PCT No.: PCT/IB2008/001974
§ 371 (c)(1),
(2), (4) Date: Jan. 12, 2010

(87) PCT Pub. No.: WO2009/016469
PCT Pub. Date: Feb. 5, 2009

(65) Prior Publication Data
US 2010/0171251 A1    Jul. 8, 2010

(30) Foreign Application Priority Data

Aug. 1, 2007 (JP) ................................ 2007-200769
Feb. 15, 2008 (JP) ................................ 2008-034934

(51) Int. Cl.
*B60G 11/10* (2006.01)
(52) U.S. Cl. .......... 280/124.116; 280/682; 280/124.175; 267/271
(58) Field of Classification Search ........... 280/124.116, 280/682, 686, 124.175, 124.17; 267/271, 267/262
See application file for complete search history.

(56) References Cited

U.S. PATENT DOCUMENTS

| | | | |
|---|---|---|---|
| 2,083,942 A * | 6/1937 | Chase | 267/271 |
| 2,802,663 A * | 8/1957 | Hovind | 267/28 |
| 3,030,101 A | 4/1962 | Mcintosh | |
| 5,209,518 A * | 5/1993 | Heckenliable et al. | 280/680 |
| 5,470,096 A * | 11/1995 | Baxter | 280/124.116 |
| 6,679,517 B2 * | 1/2004 | Proia | 280/682 |
| 7,866,682 B2 * | 1/2011 | Simard et al. | 280/124.175 |
| 8,006,990 B1 * | 8/2011 | Davis et al. | 280/124.175 |
| 2010/0171251 A1 * | 7/2010 | Matsuda et al. | 267/271 |

FOREIGN PATENT DOCUMENTS

| | | |
|---|---|---|
| JP | 5-246224 A | 9/1993 |
| JP | 05246224 A * | 9/1993 |

OTHER PUBLICATIONS

JP-05-246224 English translation, Sep. 1993.*
Chinese Office Action in Chinese Patent Application No. 200880100957.6, dated Aug. 1, 2011, (5 pages).

(Continued)

*Primary Examiner* — Paul N Dickson
*Assistant Examiner* — Karen A Beck
(74) *Attorney, Agent, or Firm* — Osha • Liang LLP

(57) ABSTRACT

A vehicle suspension includes a vehicle body, a supporting member, wherein a proximal end is attached to the vehicle body at a central axis. The supporting member is configured to secure an end of a vehicle suspension component to the vehicle body. A distal end of the support member includes a hanger configured to receive and to allow a tie-down hook to move in an arcuate path defined by a circle centered at the central axis.

18 Claims, 5 Drawing Sheets

OTHER PUBLICATIONS

International Preliminary Report on Patentability and Written Opinion in PCT/IB2008/001974 mailed Feb. 11, 2010 (8 pages).
Office Action in Japanese Patent Application No. 2008-034934, dated Aug. 24, 2010 (4 pages).
International Search Report for PCT/IB2008/001974 mailed Nov. 14, 2008 (3 pages).
Written Opinion of ISA for PCT/IB2008/001974 mailed Nov. 14, 2008 (11 pages).

* cited by examiner

SUPPORTING STRUCTURE FOR VEHICLE SUSPENSION COMPONENT

CROSS-REFERENCE TO RELATED APPLICATIONS

The present application claims priority from Japanese Patent Application No. 2007-200769, filed Aug. 1, 2007 and Japanese Patent Application No. 2008-034934, filed Feb. 15, 2008. The contents of the priority applications are hereby incorporated by reference in their entirety.

BACKGROUND OF THE DISCLOSURE

1. Field of the Disclosure

The present disclosure relates to a supporting structure for a leaf spring in a vehicle.

2. Description of the Related Art

A structure in which a supporting member (supporting bracket) supporting a leaf spring was formerly provided (e.g., in Japanese Patent Application Publication No. 1993(H05)-246224) comprising a hanging portion to hang a traction hook, a tie-down hook, or the like in a vehicle equipped with a leaf-spring suspension.

Such a structure may be used, for example, when the vehicle is to be fixed to a ship by means of a wire or a chain at the time of a ship-transportation of the vehicle. In this case, one end of the wire or chain may be affixed to the ship, and a tie-down hook provided at the other end of the wire or chain may be hung on a hanging portion. Accordingly, an external force (i.e., a pulling force) may be applied through the tie-down hook to a side of vehicle body.

However, there may be concern that changes in loading conditions and/or moments from those at the time of normal running or parking are applied to the supporting member may compromise the integrity and durability of the supporting member.

SUMMARY OF THE CLAIMED SUBJECT MATTER

In one aspect, the present disclosure relates to a structure to support a vehicle suspension component including a vehicle body, a supporting member comprising a proximal end and a distal end, wherein the proximal end is attached to the vehicle body at a central axis, wherein the supporting member is configured to secure an end of the vehicle suspension component to the vehicle body, wherein the distal end of the support member comprising a hanger is configured to receive a tie-down hook, and wherein the hanger is configured to allow the tie-down hook to move in an arcuate path defined by a circle centered at the central axis.

In another aspect, the present disclosure relates to a structure to support a vehicle suspension component including a vehicle body, a means for supporting the vehicle suspension component, the supporting means comprising a proximal end and a distal end, wherein the proximal end is attached to the vehicle body at a central axis, the supporting means configured to secure an end of the vehicle suspension component to the vehicle body, the distal end of the supporting means comprising a means for hanging configured to receive a tie-down hook, and wherein the hanging means is configured to allow the tie-down hook to move in an arcuate path defined by a circle centered at the central axis.

In another aspect, the present disclosure relates to a method to secure a tie-down hook to a vehicle suspension including attaching a proximal end of a supporting member to a vehicle body at a central axis, securing an end of a vehicle suspension component between the proximal end and a distal end of the supporting member, receiving the tie-down hook at a hanger disposed at the distal end of the supporting member, wherein the tie-down hook is capable of being positioned in an arcuate path in the hanger, and defining the arcuate path is by a circle centered at the central axis.

BRIEF DESCRIPTION OF DRAWINGS

Features of the present disclosure will become more apparent from the following description in conjunction with the accompanying drawings.

DETAILED DESCRIPTION

Embodiments of the present disclosure relate to apparatus and method configured to provide a supporting structure for a leaf spring that is capable of reducing a load and/or a moment applied to respective portions due to the external force irrespective of the direction of the external force applied from the hook, and capable of enhancing a durability of the supporting member or the leaf spring.

Hereinafter, selected embodiments of the present disclosure will be explained in detail with reference to the drawings. In each of the following embodiments, the exemplary vehicle will be depicted as equipped with a leaf spring-type rear suspension. However, it should be understood that embodiments disclosed herein may be applicable to other vehicle suspension types without departing from the invention as claimed.

Additionally, in the Figures, the reference arrow FR indicates the front (or forward) direction of the vehicle, the reference arrow UP indicates the upward direction of the vehicle, and the reference arrow OUT indicates the outward direction (in a width direction) of the vehicle. Moreover, in the following disclosure, there may be similar structural components. Hence, in the following descriptions for embodiments, similar structural components will be given similar reference signs, and duplicate explanations thereof will be omitted.

First Exemplary Embodiment

Figure 1:
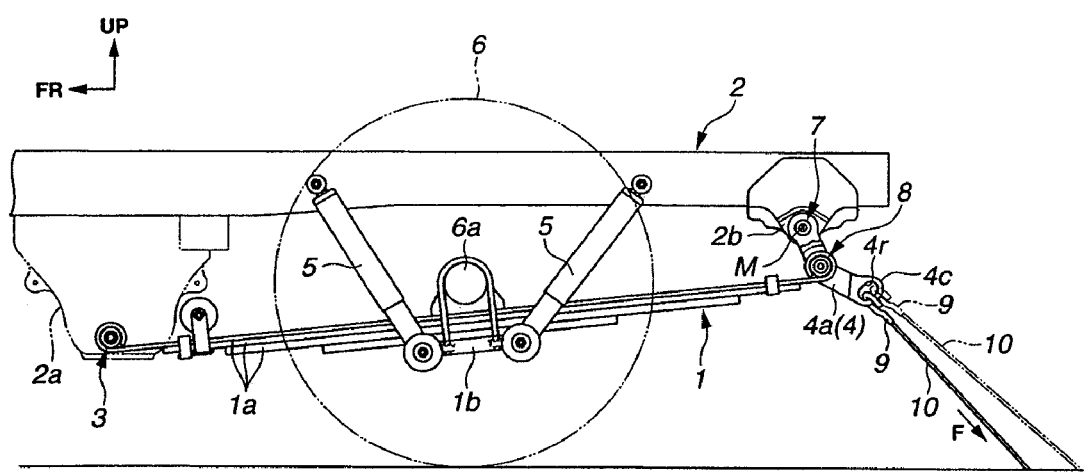
FIG. 1 is a side view of a vehicular rear suspension employing a leaf-spring supporting structure according to a first exemplary embodiment of the present disclosure.
Figure 2:
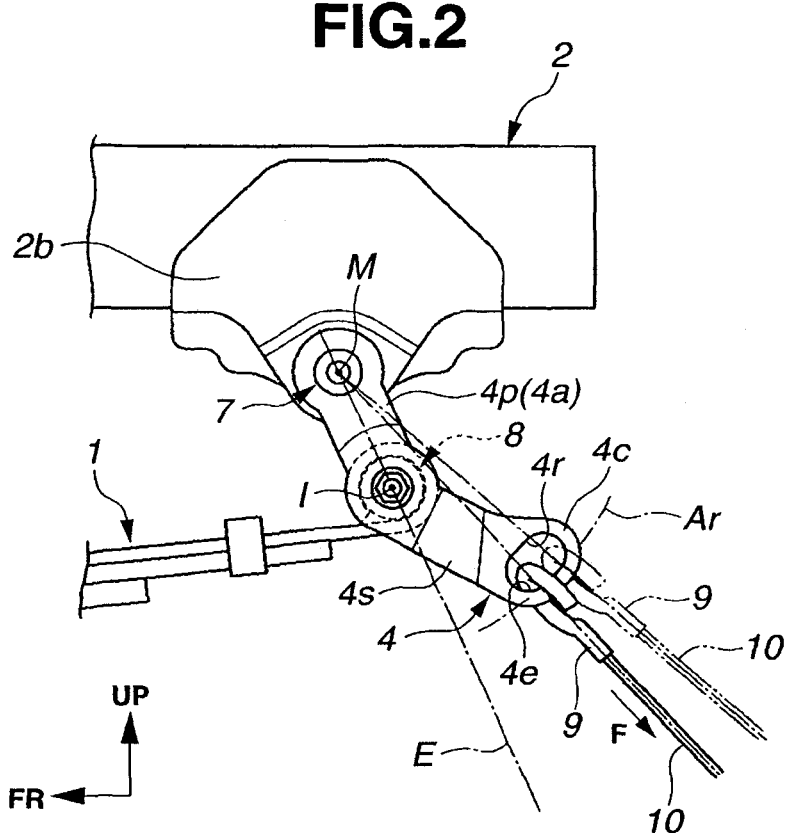
FIG. 2 is a side view of the leaf-spring supporting structure according to the first exemplary embodiment of the present disclosure.
Figure 3:
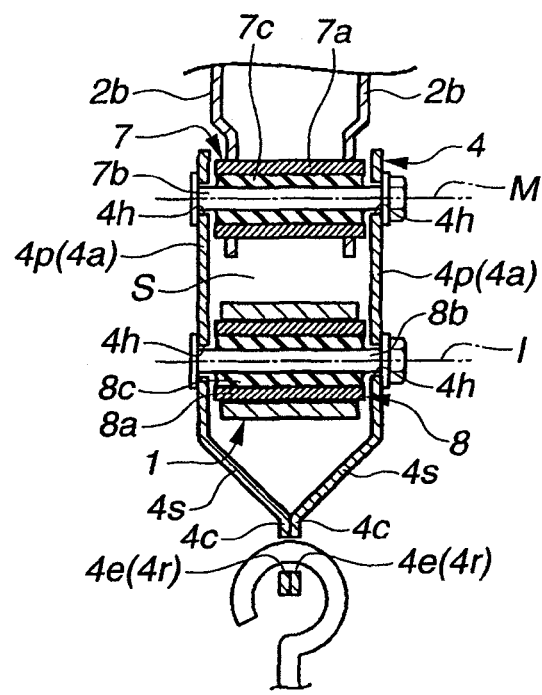
FIG. 3 is a rear view of the leaf-spring supporting structure according to the first exemplary embodiment of the present disclosure.

Referring initially to FIGS. 1-3, a first exemplary embodiment in accordance with the present disclosure is shown. FIG. 1 depicts a side view of a rear suspension including a leaf-spring supporting structure according to the first exemplary embodiment. FIG. 2 depicts a side view of the leaf-spring supporting structure. FIG. 3 depicts a rear view of the leaf-spring supporting structure.

As shown in FIG. 1, a leaf spring 1 may be constructed by binding a lamination of a plurality of band-plate-shaped plate springs 1a extending in a front-to-rear (i.e., longitudinal) direction of the vehicle.

A front end portion of leaf spring 1 may be attached or connected through an attachment member 3 to a lower end portion of a protruding portion 2a protruding downwardly from a side member 2 of the vehicle body extending in the front-rear direction of the vehicle. For the purpose of this disclosure, the term "vehicle body" will be used to refer to central structural components of the vehicle configured to receive and retain suspension components and includes, but is not limited to, vehicle body panels, vehicle uni-body components, vehicle frame components, and the like. On the other hand, a rear end portion of leaf spring 1 may be attached through a supporting member 4 to an a rear end portion of side member 2. Additionally, a bracket 1b fixed to a center and lower portion of leaf spring 1 may be supported by side member 2 through dampers 5. An axle 6a of a road wheel 6 may be fixed or fastened to bracket 1b as shown.

As shown in FIG. 3, the rear end portion of side member 2 may be formed with a pair of flange portions 2b. The pair of flange portions 2b may suspend downwardly from both side walls of side member 2 and may be substantially in parallel to each other in the vehicle width (or transverse) direction. Supporting member 4 may be attached to flange portions 2b through an attachment member 7. It should be noted that attachment member 7 in this exemplary embodiment corresponds to a vehicle-body attaching portion of supporting member 4.

Attachment member 7 may be provided to hang across the pair of flange portions 2b in a substantially horizontal posture in the vehicle width direction. Attachment member 7 may include an outer tube 7a substantially in the form of a cylindrical tube, a shaft 7b passing through the inside of outer tube 7a, and a bushing 7c substantially in the form of a cylindrical tube. Bushing 7c fills a space between outer tube 7a and shaft 7b. Outer tube 7a may be rigidly fixed or releasably fastened to flange portions 2b while shaft 7b may be rigidly fixed or releasably fastened to supporting member 4. Bushing 7c may be formed of an elastic material (e.g., rubbers, polymers, elastomers, etc.) and may be connected to both outer tube 7a and shaft 7b.

As shown in FIG. 3, supporting member 4 may include a pair of supporting brackets 4a. Each of the pair of supporting brackets 4a may be formed by bending a plate-shaped member. The pair of supporting brackets 4a may include parallel portions 4p that may be substantially parallel with each other across an offset space S such that a substantially constant interval exists between both parallel portions 4p. Each of parallel portions 4p may comprise an upper portion of supporting bracket 4a and may correspond to positions of attachment member 7 and a leaf-spring supporting member 8. Moreover, on lower sides of parallel portions 4p oblique portions 4s may extend obliquely in a downward direction so as to approach each other. Further, on lower sides of oblique portions 4s, contact portions 4c may overlap with each other. Contact portions 4c may abut each other and may be joined together by means of welding or the like. Contact portions 4c may be located at a midsection between parallel portions 4p in the vehicle width direction. Thus, by providing oblique portions 4s, rigidity may be enhanced as compared to circumstances where supporting brackets 4a are bent in a crank shape between parallel portions 4p and contact portions 4c.

Parallel portions 4p of the pair of supporting brackets 4a may be formed with two sets of upper and lower through-holes 4h. Two upper through-holes 4h may be made to face each other, and two lower through-holes 4h may be made to face each other. Shaft 7b of attachment member 7 may pass through upper through-holes 4h, and may be engaged with or fixed to supporting brackets 4a by means of welding or the like. On the other hand, a shaft 8b of leaf-spring supporting member 8 may pass through lower through-holes 4h, and may be engaged with or fixed to supporting brackets 4a by means of welding or the like.

The pair of supporting brackets 4a may be attached to side member 2 through attachment member 7. Hence, a central axis M of the attaching point (area) to side member 2 in each of the pair of supporting brackets 4a, 4a may be substantially identical (i.e., co-axial) to a central axis of shaft 7b.

Leaf-spring supporting member 8 may be provided to hang across the pair of supporting brackets 4a in a substantially horizontal posture in the vehicle width direction. Leaf-spring supporting member 8 may include an outer tube 8a, a shaft 8b passing through the inside of outer tube 8a, and a bushing 8c filling a space between outer tube 8a and shaft 8b. Outer tube 8a may be fixed to the rear end portion of leaf spring 1 while shaft 8b may be fixed to supporting brackets 4a. Similar to bushing 7c, bushing 8c may also be formed of an elastic material (e.g., rubbers, polymers, elastomers, etc.) and may be connected to outer tube 8a and shaft 8b. As shown, leaf-spring supporting member 8 corresponds to a connecting portion of leaf spring 1 to supporting member 4.

Contact portions 4c defining lower ends of supporting brackets 4a may be formed having elongated holes 4r extending in an circular arcuate path defined by a circle having its center at a central axis M of shaft 7b of attachment member 7. Contact portions 4c may be formed in the substantially same shape as each other, and may entirely overlap each other. Accordingly, elongated holes 4r may also entirely overlap each other.

As shown, a lower edge 4e of long hole 4r may extend substantially along a circular arc Ar having central axis M as its center. Elongated hole 4r may be designed to allow a tie-down hook 9 to be inserted into elongated hole 4r and to be hung on lower edge 4e. It should be noted that for the purpose of this disclosure, the portion of elongated holes 4r that includes lower edge 4e may be considered a tie-down portion while the portion of elongated hole 4r that is positioned below contact portion 4c may be considered as a hanging portion or hooking portion.

As such, the hanging (hooking) portion of tie-down hook 9 may be rotated along lower edge portion 4e. That is, because lower edge portion 4e on which tie-down hook 9 is hung extends in a substantially circular arc Ar, tie-down hook 9 may slide under tension of wire or strap 10. Thus, tie-down hook 9 may slide up to a position (e.g., a hanging position) at which wire 10 may be outstretched substantially perpendicular to a tangent of circular arc Ar. Thus, the stretching direction of wire 10 may be oriented in line with central axis M as the center of circular arc Ar is central axis M as mentioned above.

In the case where the stretching direction of wire 10 is toward central axis M, an external force F (FIG. 2) may be inputted through tie-down hook 9 from wire 10 applied in line with central axis M. In selected embodiments, supporting member 4 may swing about central axis M of attachment member 7 through deformation of bushing 7c. Accordingly, if the direction of external force F deviates from central axis M, a rotation moment around central axis M may result in supporting member 4. If a rotation moment results in supporting member 4, a shear load may result in leaf-spring supporting member 8, and a tensile or compressive load and a bending moment or the like may be applied to leaf spring 1.

However, as depicted, external force F inputted through tie-down hook 9 from wire 10 is applied in a direction that would intersect central axis M of attachment member 7. Accordingly, such a rotation moment should not result in supporting member 4. Thus, the first exemplary embodiment should prevent undesired loads and moments from being transmitted to leaf spring 1 and members 3 and 8.

It may be desirable to form an angle range of circular arc Ar so lower edge portion 4e of elongated hole 4r may be set in to include an expected range of the direction in which external force F will be applied from tie-down hook 9 and wire 10.

Moreover, as shown in FIG. 2, contact portions 4c serving as a hanging portion may be disposed to deviate in the rear direction of vehicle from an extension line E. Extension line E may extend from central axis M of attachment member 7 through a central axis I of leaf-spring support 8 serving as a connector of leaf spring 1 to supporting member 4, as viewed from a lateral side of the vehicle. Leaf spring 1 may have its stroke configured to rotate around central axis I of leaf-spring supporting member 8. At this time, if contact portions 4c are disposed at a more forward position, the rear end portion of leaf spring 1 may tend to interfere with oblique portions 4s, contact portions 4c, tie-down hook 9, and the like. Therefore in this case, it may be beneficial do set a distance between central axis I of leaf-spring supporting member 8 and contact portions 4c to be long enough to avoid such interference. As a result, supporting member 4 may become longer in the vertical direction, resulting in increased weight. However, supporting member 4 may be restricted in size in the vertical direction by locating contact portions 4c at a more rearward position than extension line E so as to keep contact portions 4c away from the rear end of leaf spring 1.

As described above, the hanging position of tie-down hook 9 on lower edge portion 4e may move substantially along lower edge 4e, (i.e., in a substantially circular arc Ar) about central axis M of attachment member 7. By allowing the hanging position of tie-down hook 9 to move with a direction (i.e., the acting direction) of external force F inputted therefrom, external force F may be applied toward central axis M of attachment member 7. Thus, a rotation moment about central axis M in supporting member 4 resulting from external force F inputted from this tie-down hook 9 may be suppressed. Similarly, an undesired load or moment following such a rotation moment in leaf-spring supporting member 8 and leaf spring 1 may also be suppressed. Accordingly, durability and longevity in each of supporting member 4, leaf spring 1, and the like may be improved.

Moreover, the arc-shaped elongated hole 4r may be provided in contact portion 4c of supporting member 4 such that lower edge portion 4e may be extended along a substantially circular arc about central axis M, and tie-down hook 9 may be adapted to hang on lower edge portion 4e. Therefore, the hanging portion that causes external force F to act in the direction toward central axis M by enabling the hanging portion to move may be designed as a relatively simple structure incorporating a lower edge portion 4e of elongated hole 4r.

Moreover, contact portion 4c serving as the hanging portion may deviate in the rear direction of vehicle from extension line E passing from central axis M of attachment member 7 through central axis I of leaf-spring supporting member 8 serving as the connector of leaf spring 1 to supporting member 4, as viewed from the lateral side of vehicle. Therefore, a structure preventing the rearward end of leaf spring 1 from interfering with contact portion 4c and the like may be obtained while achieving a reduction in size and weight.

Second Exemplary Embodiment

Figure 4:
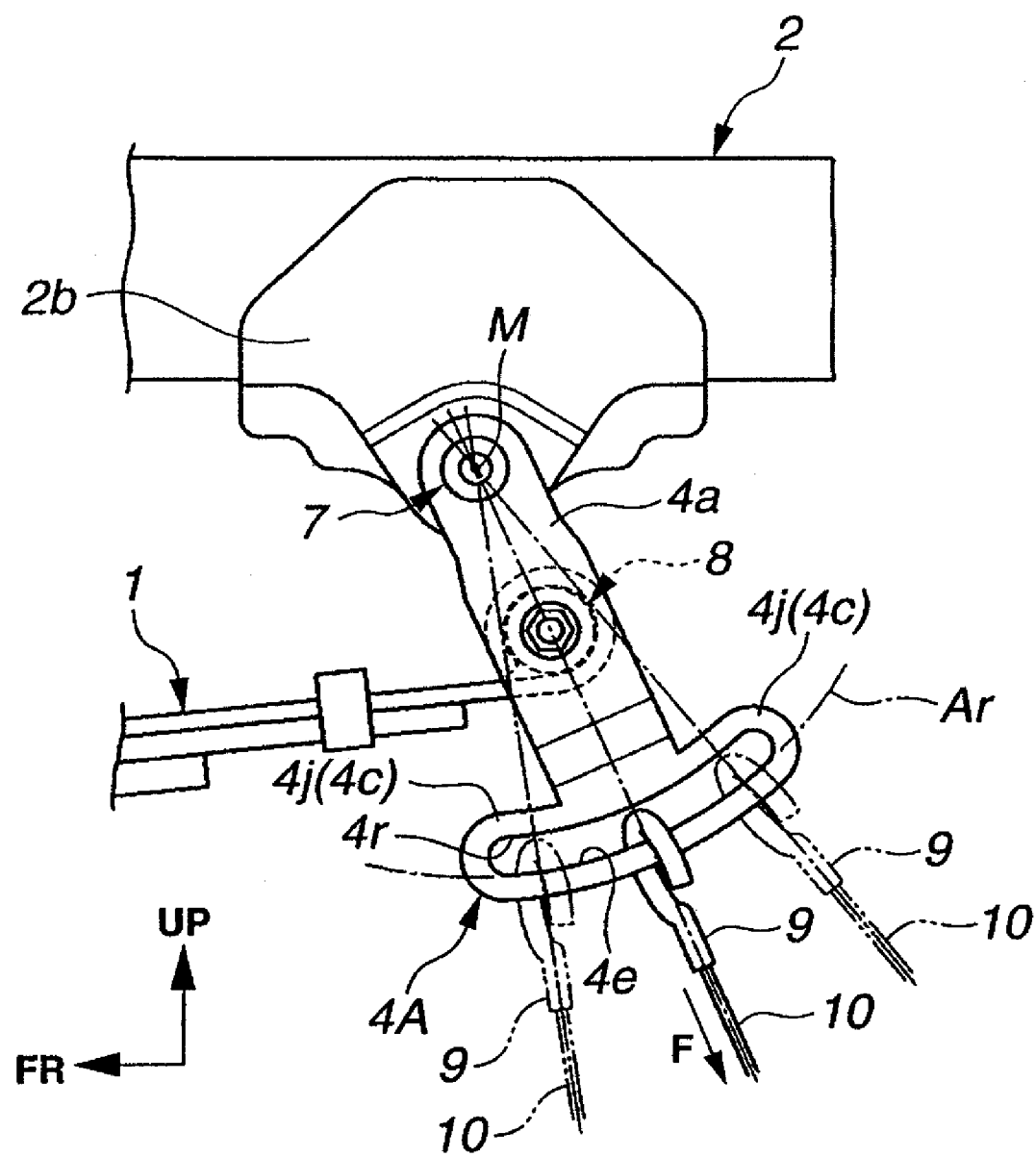
FIG. 4 is a side view of a leaf-spring supporting structure according to a second exemplary embodiment of the present disclosure.

Referring now to FIG. 4, a side view of a supporting structure for a leaf spring according to a second exemplary embodiment of the present disclosure is shown. As shown, supporting brackets 4a constituting a supporting member 4A include protruding portions 4j protruding from central portions of contact portions 4c in both front and rear directions.

As such, each of supporting brackets 4a is depicted as formed in an anchor shape when viewed from the lateral side of vehicle. Thus, each contact portion 4c may be formed having an arc-shaped elongated hole 4r. Each arc-shaped elongated hole 4r may extend longitudinally in the front-to-rear direction from the central portion of contact portion 4c up to each protruding portion 4j. Lower edge portion 4e of elongated hole 4r may serve as the hanging portion. Each lower edge portion 4e may extend along a circular arcuate path Ar defined central axis M. By virtue of such a structure, the desired effects mentioned in the first exemplary embodiment may be obtained in a wider range of angles for wire 10.

Third Exemplary Embodiment

Figure 5:
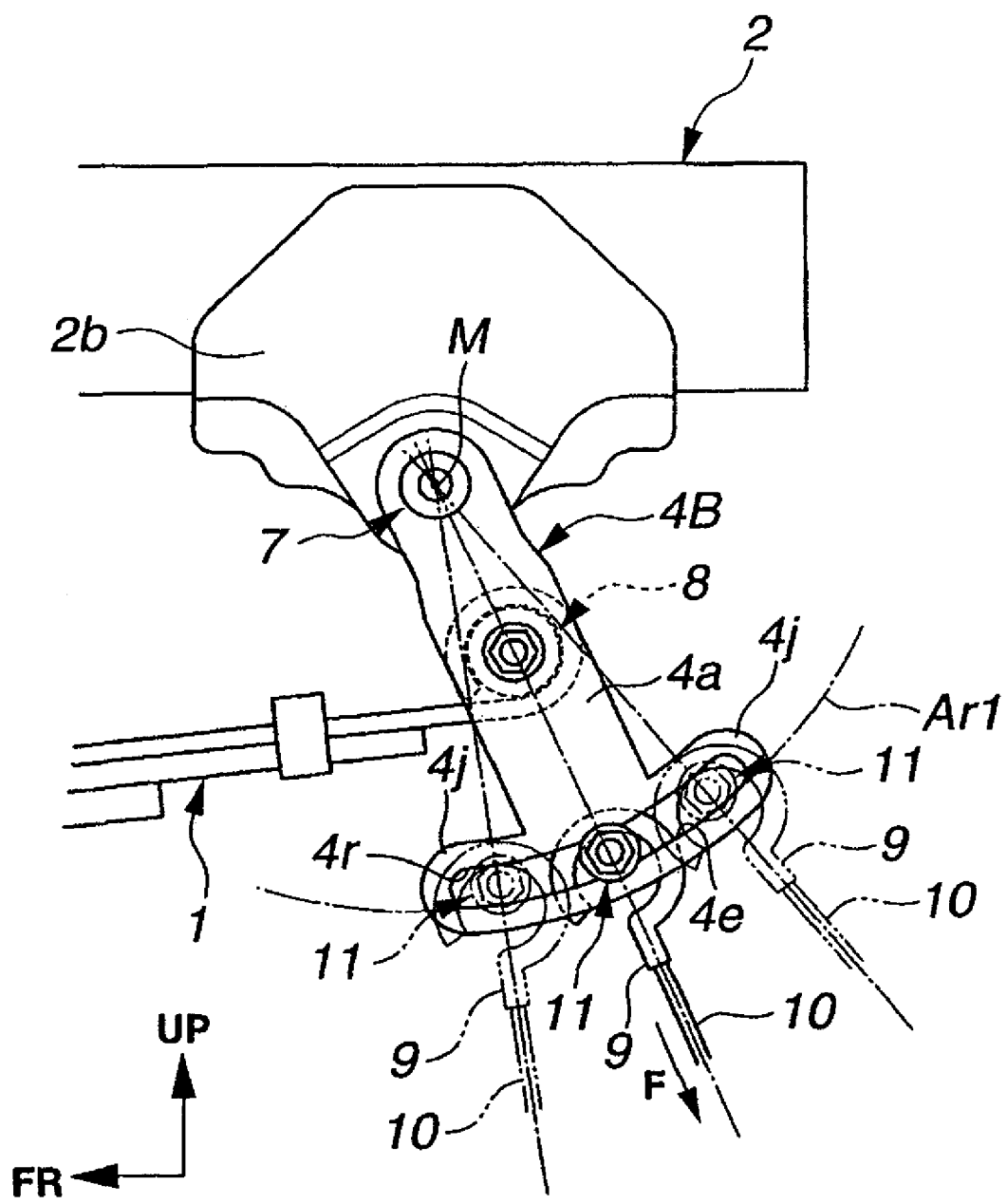
FIG. 5 is a side view of a leaf-spring supporting structure according to a third exemplary embodiment of the present disclosure.
Figure 6:
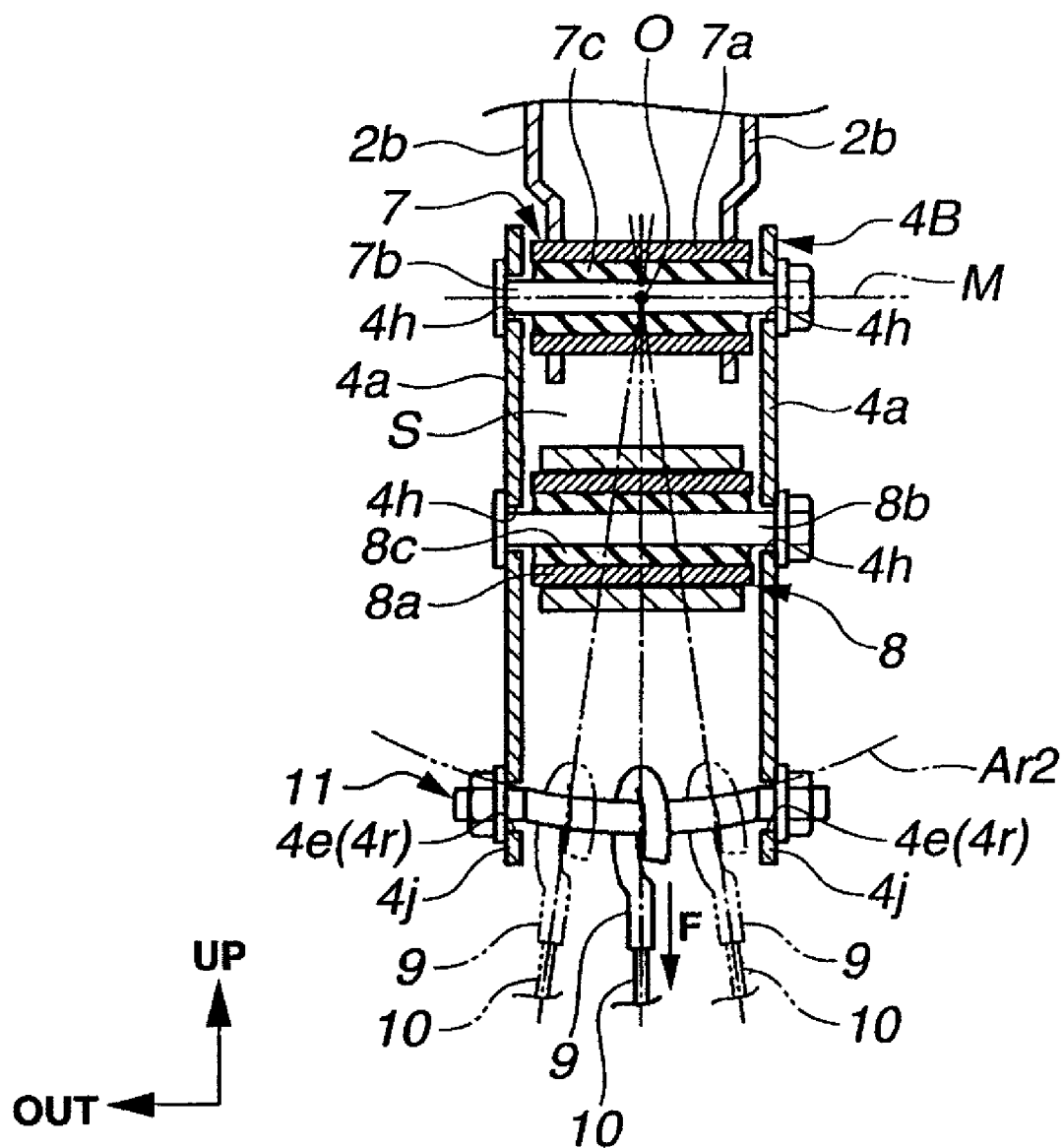
FIG. 6 is a rear view of the leaf-spring supporting structure according to the third exemplary embodiment of the present disclosure.

Referring now to FIGS. 5 and 6, a third exemplary embodiment in accordance with the present disclosure is shown. FIG. 5 is a side view of a supporting structure for a leaf spring and FIG. 6 depicts a rear view of the leaf-spring supporting structure.

As shown, shapes of lower portions of the pair of supporting brackets 4a of supporting member 4B are different from those in the above first and second exemplary embodiments. Specifically, each of supporting brackets 4a is shown formed in a flat-plate shape from the upper portion to the lower portion of supporting bracket 4a, as shown in FIG. 6. Supporting brackets 4a may be disposed almost parallel to each other across space S, thereby having a substantially constant interval between them from their upper portion to their lower portion.

The structures of attachment member 7 and leaf-spring supporting member 8 themselves may be similar as those depicted in relation to the second exemplary embodiment above. Accordingly, central axis M of the attaching point (area) between side member 2 and one of the pair of supporting brackets 4a may be substantially the same as that between side member 2 and the other supporting bracket 4a.

As shown in FIG. 5, at the lower portion of each of the pair of supporting brackets 4a, each supporting bracket 4a may include a contact portion 4c having a substantially same shape as that in the second exemplary embodiment above. Each contact portion 4c may be formed having an elongated hole 4r having substantially same shape as that in the above-described second exemplary embodiment. Also, lower edge portion 4e of elongated hole 4r may extend in a substantially circular arcuate path Ar1 defining central axis M of shaft 7b of attachment member 7 as a center of circular arc Ar1.

As shown in FIG. 6, a shaft 11 passing through elongated holes 4r to extend and suspend across the pair of supporting brackets 4a may be provided. Tie-down hook 9 may be hung on shaft 11. Shaft 11 may be adapted to move along (lower edge portions 4e of) the pair of elongated holes 4r. It should be noted that elongated holes 4r may be analogous to rails and shaft 11 may be analogous to a slider.

Namely, center line and lower edge portions 4e of elongated holes 4r may be provided as a rail extending along circular arc Ar1 defined by central axis M. Shaft 11 provided as a hanging portion may move along lower edge portions 4e of elongated holes 4r. Accordingly, shaft 11 may slide up to a position at which the stretching direction of wire 10 becomes substantially perpendicular to a tangent of circular arc Ar1, by means of external force F from wire 10. At this time, the stretching direction of wire 10 may be forced to face toward central axis M as the center of circular arc Ar1 is central axis M as described above. Thus, external force F inputted from tie-down hook 9 may be applied toward central axis M in a manner similar to the above first exemplary embodiment. Accordingly, the rotation moment around central axis M in supporting member 4B due to external force F may be suppressed. Thereby, an undesired load or moment occurring from the rotation moment in leaf-spring supporting member 8 and leaf spring 1 may also be suppressed.

Furthermore, it may be desirable to form an angle range for circular arc Ar1 of elongated hole 4r so that it may be set in accordance with an expected range of directions in which external force F may be applied from tie-down hook 9 (i.e., an expected range of the direction of wire 10).

Moreover, shaft 11 may extend in an arc shape substantially along a circular arc Ar2 defining a central point O of central axis M between the pair of supporting brackets 4a.

Accordingly, on the same principle as the suppression of the rotation moment about central axis M, a rotation moment about central point O that may occur in supporting member 4B by means of external force F may also be suppressed. Thereby, an undesired load or moment following this rotation moment caused to leaf-spring supporting member 8 and leaf spring 1 may be suppressed.

As mentioned above, the pair of supporting brackets 4a of supporting member 4B may include elongated holes 4r formed as a rail and extended along circular arc Ar1 defined by central axis M and shaft 11 may be provided as a hanging portion and may be capable of moving along elongated holes 4r.

Furthermore, by causing the hanging position of tie-down hook 9 to move in accordance with an applied external force F inputted from tie-down hook 9, external force F may be applied toward central axis M of attachment member 7. Thus, the rotation moment about central axis M of supporting member 4B due to external force F inputted from tie-down hook 9 may be suppressed. Thereby, an undesired load or moment following this rotation moment applied to leaf-spring supporting member 8 and leaf spring 1 may also be suppressed.

Moreover, the central axes of the attaching points (areas) of the pair of supporting brackets 4a to the vehicle body (i.e., side member 2) may be substantially the same as central axis M. Moreover, shaft 11 extending substantially along circular arc Ar2 defining central point O of central axis M between the pair of supporting brackets 4a as the center of circular arc Ar2 may be provided as a hanging portion, and may be hung across the pair of supporting brackets 4a.

Therefore, by causing the hanging position of tie-down hook 9 to move in accordance with an applying direction of external force F inputted from tie-down hook 9, external force F may be applied toward central point O. Thus, the rotation moment around central point O caused in supporting member 4B due to external force F inputted from tie-down hook 9 may be suppressed. Thereby, an undesired load or moment following this rotation moment applied to leaf-spring supporting member 8 and leaf spring 1 may also be suppressed.

Moreover, shaft 11 as the hanging portion for tie-down hook 9 may be provided so as to hang across the pair of supporting brackets 4a. Because space S may be kept between the pair of supporting brackets 4a, it may be made easier to hang tie-down hook 9 on shaft 11.

In the case that tie-down hook 9 itself is made to slide as the above first exemplary embodiment, tie-down hook 9 may experience difficulty in sliding because of the curvature or a surface texture of a hooking portion of tie-down hook 9. However, because shaft 11 on which tie-down hook 9 is hung may be made to move along elongated holes 4r formed as a specific rail, tie-down hook 9 may be moved further smoothly up to the (e.g., optimum) hanging position without the influences of the curvature or surface texture of the hooking portion of tie-down hook 9.

As described above, selected embodiments according to the present disclosure have been explained. However, the present disclosure should not be limited to the above-described embodiments, and various modifications or variations of the embodiments may occur according to the present disclosure.

For example, the edge portion of the hanging portion may be formed to be opened at least within one range of the central-axis side thereof. More specifically, the hanging portion may be formed in an arm shape extending almost along a circular arc. Alternatively, for the purpose of using as the hanging portion, there may be provided a protruding wall that protrudes from the supporting member (supporting bracket) to have a hook-shaped cross section and that has an edge portion formed in a circular-arc shape.

Moreover, the physical structure of the supporting member, the supporting bracket, the slider, or the hanging shaft may also be modified variously. For example, the arc-shaped hanging shaft may be fixed to the supporting brackets therebetween.

Moreover, the structures disclosed in the present disclosure may be combined with one another, as appropriate. For example, in the structure causing the contact portion of the supporting bracket to deviate in the rear direction relative to the above-mentioned extension line as the first exemplary embodiment, the shaft of the third exemplary embodiment may be provided.

Moreover, in the above respective embodiments, the case has been exemplified that the external force acts on the supporting member obliquely in the downward direction by means of the wire provided with the tie-down hook. However, the present disclosure may similarly be applicable to the case that the external force acts on in an almost horizontal direction by means of a traction hook.

While the disclosure has been presented with respect to a limited number of embodiments, those skilled in the art, having benefit of this disclosure, will appreciate that other embodiments may be devised which do not depart from the scope of the present disclosure. Accordingly, the scope of the disclosure should be limited only by the attached claims.

What is claimed is:

1. A structure to support a vehicle suspension component, the structure comprising:
   a vehicle body;
   a supporting member comprising a proximal end and a distal end, wherein the proximal end is attached to the vehicle body at a central axis;
   the supporting member configured to secure an end of the vehicle suspension component to the vehicle body;
   the distal end of the support member comprising a hanger configured to receive a tie-down hook;
   wherein the hanger is configured to allow the tie-down hook to move relative to the supporting member in an arcuate path defined by a circle centered at the central axis.

2. The structure of claim 1, wherein the supporting member comprises at least two support brackets spaced apart by an offset.

3. The structure of claim 2, wherein the at least two support brackets comprise:
   parallel portions extending downward from the proximal end of the support member;

oblique portions extending from the parallel portions toward the distal end of the support member; and abutting portions at the distal end of the support member, wherein the hanger is formed within the abutting portions.

4. The structure of claim 2, further comprising a hanging shaft configured to extend across the offset in a transverse are defined by a center point of the central axis between the at least two support brackets.

5. The structure of claim 4, wherein: the at least two support brackets comprise rails extending along arcs comprising substantially identical radii centered about the central axis, and wherein the hanging shaft is adapted to move along the pair of rails.

6. The structure of claim 1, wherein the vehicle suspension component comprises a leaf spring.

7. The structure of claim 1, wherein the hanger of the support member extends rearward beyond an extension line passing through the central axis and through a center of a connection of the vehicle suspension component to the supporting member.

8. The structure of claim 1, wherein the hanger comprises an edge portion extending substantially concentric to the arcuate path.

9. The structure of claim 1, wherein the hanger of the supporting member comprises: a rail extending substantially concentric to the arcuate path; and a slider configured to move along the rail.

10. A structure to support a vehicle suspension component, the structure comprising:
    a vehicle body;
    a means for supporting the vehicle suspension component, the supporting means comprising a proximal end and a distal end, wherein the proximal end is attached to the vehicle body at a central axis;
    the supporting means configured to secure an end of the vehicle suspension component to the vehicle body;
    the distal end of the supporting means comprising a means for hanging configured to receive a tie-down hook;
    wherein the hanging means is configured to allow the tie-down hook to move relative to the supporting means in an arcuate path defined by a circle centered at the central axis.

11. The structure of claim 10, wherein the supporting means comprises at least two support brackets spaced apart by an offset.

12. The structure of claim 11, further comprising a shaft means for extending across the offset in a transverse are defined by a center point of the central axis between the at least two support brackets.

13. The structure of claim 12, wherein: the at least two support brackets comprise rail means for extending along arcs comprising substantially identical radii centered about the central axis, and wherein the shaft means is adapted to move along the pair of rails.

14. A method to secure a tie-down hook to a vehicle suspension, the method comprising:
    attaching a proximal end of a supporting member to a vehicle body at a central axis;
    securing an end of a vehicle suspension component between the proximal end and a distal end of the supporting member;
    receiving the tie-down hook at a hanger disposed at the distal end of the supporting member, wherein the tie-down hook is capable of being positioned relative to the supporting member in an arcuate path in the hanger; and
    defining the arcuate path is by a circle centered at the central axis.

15. The method of claim 14, further comprising spacing at least two support brackets apart by an offset to form the supporting member.

16. The method of claim 15, wherein the at least two support brackets comprise:
    parallel portions extending downward from the proximal end of the support member;
    oblique portions extending from the parallel portions toward the distal end of the support member; and
    abutting portions at the distal end of the support member, wherein the hanger is formed within the abutting portions.

17. The method of claim 15, further comprising extending a hanging shaft across the offset in a transverse are defined by a center point of the central axis between the at least two support brackets.

18. The method of claim 17, further comprising: extending rails of the at least two support brackets along arcs having substantially identical radii centered about the central axis; and moving the hanging shaft along the pair of rails.

* * * * *